United States Patent [19]

Ide

[11] Patent Number: 4,676,668

[45] Date of Patent: Jun. 30, 1987

[54] MULTI-DEFLECTION PAD-TYPE HYDRODYNAMIC BEARING

[76] Inventor: Russell D. Ide, 28 Daniel Dr., Coventry, R.I. 02816

[21] Appl. No.: 855,409

[22] Filed: Apr. 24, 1986

Related U.S. Application Data

[63] Continuation-in-part of Ser. No. 745,199, Jun. 17, 1985, abandoned.

[51] Int. Cl.⁴ .................... F16C 17/06; F16C 17/03
[52] U.S. Cl. .................................. 384/117; 384/122; 384/308
[58] Field of Search ............... 384/117, 119, 122, 124, 384/306, 309, 308

[56] References Cited

U.S. PATENT DOCUMENTS

| | | | |
|---|---|---|---|
| 3,675,977 | 7/1972 | Arsenius et al. | 384/117 |
| 3,951,475 | 4/1976 | Okano et al. | 384/117 |
| 4,403,873 | 9/1983 | Gardner | 384/306 |
| 4,496,251 | 1/1985 | Ide | 384/306 |

*Primary Examiner*—Lenard A. Footland
*Attorney, Agent, or Firm*—Barlow & Barlow

[57] ABSTRACT

A hydrodynamic bearing is disclosed in which there are a plurality of bearing pads that each have a face member and a support member, the pad being separated from the support member by at least one leg-like ligament. Each leg-like ligament is arranged at an angle to the pad face to permit the pad to rock for shaft alignment and may be provided with a dog leg portion to permit movement of the pad in the direction of the load to compensate for unequal loads.

4 Claims, 9 Drawing Figures

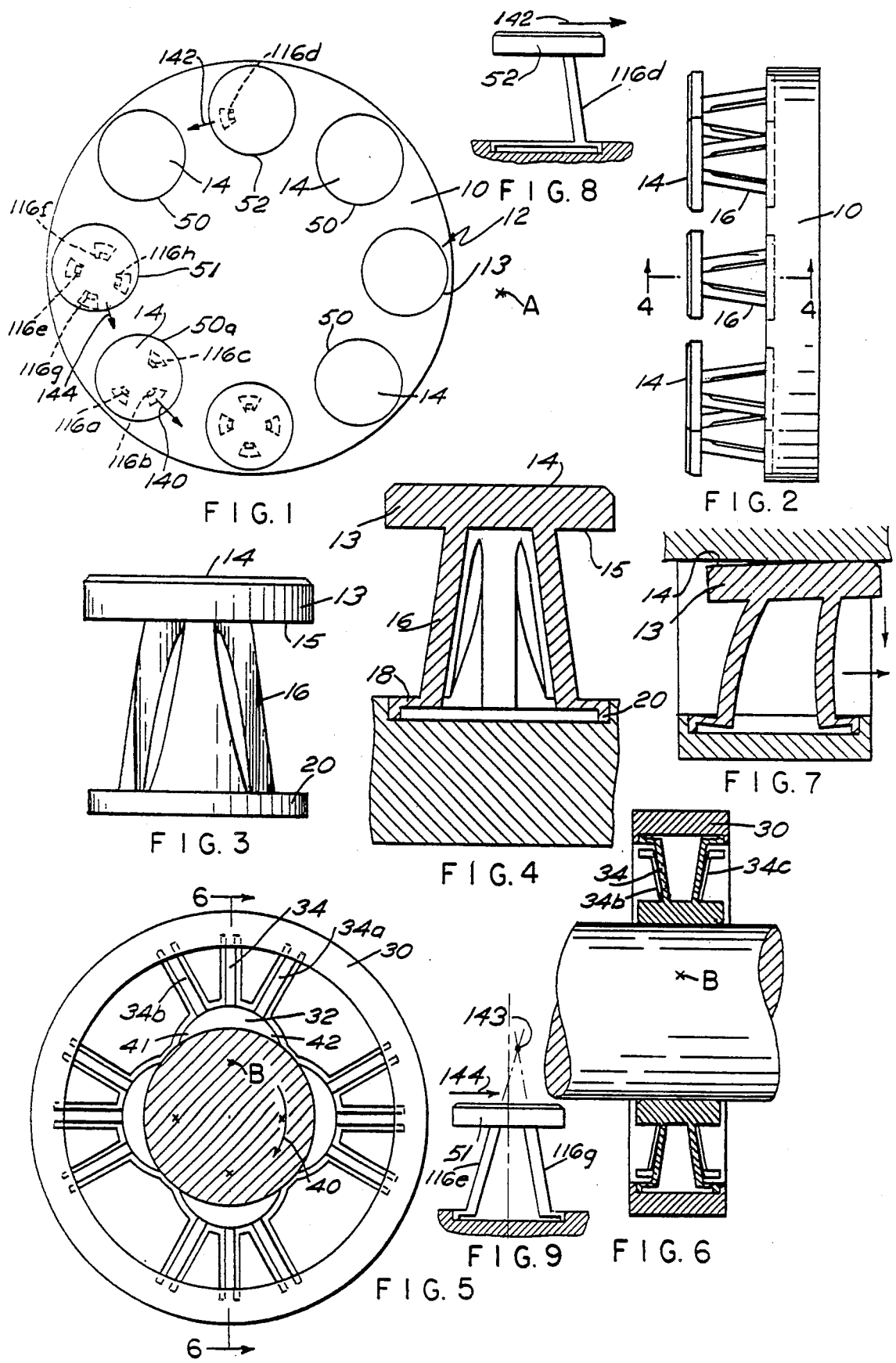

MULTI-DEFLECTION PAD-TYPE HYDRODYNAMIC BEARING

RELATED APPLICATION

This application is a continuation-in-part of my application Ser. No. 745,199, filed June 17, 1985, abandoned.

BACKGROUND OF THE INVENTION

Hydrodynamic bearings that are also sometimes known as swing pad bearings, are mounted in such a way that they can move to permit the formation of a wedge-shaped film of lubricant between the relatively moving parts. Essentially the pad displaces with a swing-type motion about a center located in front of the pad surface, and bearing friction tends to open the wedge. In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In Greene Patent, U.S. Pat. No. 3,930,691, the rocking is provided by elastomers that are subject to contamination and deterioration.

To improve upon this problem, there is shown in the Ide patent, U.S. Pat. No. 4,496,251 a pad which deflects with web-like ligaments so that a wedge shaped film of lubricant is formed between the relative moving parts. The webs in this disclosure are flexible in the direction of motion but are relatively stiff in directions generally 90° to the direction of motion and thus cannot adjust to misalignment of the opposing member or unequal loading among pads. This limits the application of this configuration.

SUMMARY OF THE INVENTION

The present invention relates to a bearing in which the pad is spaced from the support member by at least one leg which provides flexibility in three directions. To provide flexibility in the plane of motion, the legs are angled inward to form a conical shape with the point of intersection in front of the pad surface. Each leg has a section modulus that is relatively small in the direction of desired motion to permit compensation for misalignments. Dog legs, or reverse bends permit movement of the pad in the direction of loading to compensate for unequal loads. While for normal loads the pad legs are arranged symmetrically about the pad, there are instances which the loads are very light and it is therefore desirable to have the pad legs non-symmetrical such that the pressure and friction moments will act to confirm a converging wedge. An expedient way to provide a non-symmetrical leg support arrangement is to eliminate one or several of the legs. In the extreme case, only one leg would remain. Another method is to shift the location of the point of intersection forward on the pad such that one or several of the legs are located closer to the pad center. For the non-symmetrical support structure it is understood that the bearing pads are uni-directional rather than bi-directional.

Testing of the symmetrical configuration of the present invention where the pads are bi-directional, indicates exceptional load carrying capability and high speed stability. One test in low viscosity lubricants, such as water or light turbine oil, showed load carrying capacity exceeding 2000 psi. Also because pad movement is accomplished by small deflections of the legs, the pads cannot bind or stick. Other moveable pad designs rely on sliding or rolling elements to move the pad to form the hydrodynamic wedge and are prone to contamination and binding. In the case where the pads must operate in high temperature, the pads and legs may be manufactured of high temperature materials and not limited by the elastomer or grease lubrication found in the Greene or Hall type moveable pad designs. A final advantage to the present invention is that while it provides high performance over a broad range of operating conditions, the construction costs may be very low for high volume manufacture by utilizing injection molding in plastic or sintered metal or ceramic for the bearing material. Operation in gas is also feasible.

DESCRIPTION OF THE DRAWINGS

FIG. 1 is a plan view of a typical thrust bearing having the plurality of pads made in accordance with the invention mounted thereon;

FIG. 2 is a side elevational view thereof;

FIG. 3 is an elevational view of one of the pads;

FIG. 4 is a sectional view taken on lines 4—4 of FIG. 2;

FIG. 5 is an end view of a journal bearing made in accordance with the teachings of the invention;

FIG. 6 is a sectional view taken on lines 6—6 of FIG. 5,

FIG. 7 is a diagramatic view showing the action of the pad;

FIG. 8 is a side elevational view of a non-symmetrical pad; and

FIG. 9 is a side elevational view of a non-symmetrical pad having a still further configuration.

DETAILED DESCRIPTION OF THE PREFERRED EMBODIMENTS

Referring to the drawings, the structure shown therein comprises a base or a support portion 10, upon which there are press fitted a plurality of stool-like bearing pads generally designated 12. The pads 13 as shown are substantially circular in form, and as seen in greater detail in FIGS. 3 and 4, have a supporting planar face 14. To support the pads, there extends from the rear surface 15 of the pad a plurality of leg-like ligaments 16 which are arranged at a compound angle to the pad-face such that the ligaments extend at an angle to the pad face and to each other and an imaginary extension thereof will meet at a point A in front of the pad face. The lower part of the ligaments have a dog leg as at 18 and a continuous rim 20 connects the lower end of each of the legs, the rim being press fitted into the base 10. The preferable construction of each of the ligaments is one in which the cross-section is designed so that in the direction of desired motion or flexibility, the modulus is small. This can be readily appreciated when the variable formula for moment of inertia $bh^3/12$ (English units) (the main component of sectional modulus for rectangular section, $Z = I/c = bh^2/6$) is used in an example.

In FIGS. 5 and 6 there is illustrated a journal utilizing a similar construction to that described above, which will consist essentially of a casing 30 into which fitted a plurality of pads such as 32, each of which will have a plurality of leg-like ligaments 34, 34$a$, 34$b$ and 34$c$. In the particular embodiment illustrated there are six symmetrical leg-like ligaments, all of which are directed toward an imaginary point B as seen in FIG. 5 and 6. In this journal form of bearing, if we assume that there is motion as seen by the arrow 40, the friction forces which are developed will tend to rock the pads so that the leading edge 41 will move radially outward, while a trailing edge 42 will move radially inward to develop a wedge of fluid between the journal and the pad. As it will be understood by those skilled in the art, the movement is minute but is sufficient to create the necessary wedge.

Referring back to FIG. 1, as has been mentioned above, there are situations where the loads are essentially light and in such cases there may be difficulty in the pad deflecting to create the wedge. To overcome this difficulty, the pad may be made with asymmetrical legs. For example, as seen with the pad designated 50a in FIG. 1, there are illustrated by dotted lines, legs 116a, 116b, and 116c. If we assume therefore, for the moment, that the direction of the part being supported is as seen by arrow 140, this will then allow the trailing edge of the pad to move downward into the plane of the paper as seen in the drawing and create the necessary wedge angle.

In addition to the concept of using three leg-like ligaments, which legs are spaced about the pad on a constant radius from the center of the pad face, there are other ways of achieving uni-directional bearings. Note, for example, in FIG. 9, and also the pad 51 in FIG. 1, that we have a leg-like ligament arrangement where the point of intersection of the extension of the ligaments above the pad face is at a point 143 that is ahead of the center line of the pad, being understood that the motion of the surface being supported is as depicted by the arrow 144 in FIG. 1 and FIG. 9. When viewed in plan, as seen in FIG. 1, it is apparent that the two legs 116e and 116f are closer to the pad center than they would be in a symmetrical situation.

The extreme case of providing a non-symmetrical leg-like ligament is illustrated in FIG. 8, a situation that will only work if the loads are extremely light. In this situation, we essentially maintain one leg 116d supporting a pad 52, the leg being illustrated as being in a position so that the intersection thereof with pad face is ahead of the center of the pad face, it being further understood that the motion of the part being supported is represented by the arrow 142 as illustrated both in the plan view of FIG. 1 and in FIG. 8.

In many cases the machining of the parts may not be extremely accurate, and one can envision a situation where the pad faces of the plurality of pads may not be all planar, particularly in the illustration of FIGS. 1 and 2. When this occurs the dog leg portions 18 of each of the leg-like ligaments will compensate for that inequality and allow the pad faces to pick up the loads which otherwise would be unequal on the faces. A diagram of the action that occurs is seen in the diagrammatic sketch of FIG. 7 which is greatly enlarged and out of proportion to illustrate the function. This illustrates the rocking of the pad to develop a thin wedge-shaped film of lubricant at the interface between the part supported and the upper surface of the pad.

I claim:

1. A hydrodynamic bearing supporting an opposing moving part, comprising in combination a support member, a plurality of stool-like bearing pad means, each pad means having a face member separated from said support member by at least one leg-like ligament that extends at an angle to the face member, said ligament having a sectional modulus that is small in the direction of motion of the opposing part and at right angles thereto, the face member having a load engaging pad surface and being adapted under the action of friction and pressure on said surface to rock relative to the support member in two directions to approach the opposing moving part in bearing relationship and to permit the pad means to self-align to compensate for misalignment.

2. A hydrodynamic bearing supporting an opposing moving part, said bearing comprising a plurality of bearing pad means, each pad means having a support member and a face member separated from said support member by a plurality of leg-like ligaments, the face member having a load engaging pad surface and being adapted under the action of friction and pressure on the said surface to rock to cause the trailing edge to approach the opposing moving part in bearing relationship, each leg-like ligament being disposed at an angle to the said surface of the face member and formed with a dog leg portion to permit movement of the face member in the direction of load to compensate for unequal loads and to permit the face member to rock to accommodate misalignment, said movement providing three degrees of motion.

3. A bearing as in claims 1 or 2 and having a plurality of said leg-like ligaments for each face member, wherein each leg-like ligament is formed about the face member in a symmetrical fashion.

4. A bearing as in claims 1 or 2 and having a plurality of leg-like ligaments for each face member, wherein each leg-like ligament is disposed about the face member in an non-symmetrical form to provide a uni-directional bearing in which the pad may deflect more easily.

* * * * *